(12) United States Patent
Nelson et al.

(10) Patent No.: US 8,834,083 B2
(45) Date of Patent: Sep. 16, 2014

(54) PARTITIONING CARGO SPACES

(75) Inventors: Chad Nelson, Rice Lake, WI (US);
Matthew Nelson, Cameron, WI (US)

(73) Assignee: FG Products, Inc., Rice Lake, WI (US)

( * ) Notice: Subject to any disclaimer, the term of this patent is extended or adjusted under 35 U.S.C. 154(b) by 222 days.

(21) Appl. No.: 13/453,722

(22) Filed: Apr. 23, 2012

(65) Prior Publication Data

US 2012/0205943 A1    Aug. 16, 2012

Related U.S. Application Data

(62) Division of application No. 12/357,064, filed on Jan. 21, 2009, now Pat. No. 8,186,917.

(51) Int. Cl.
*B60P 7/08* (2006.01)
*B60P 3/20* (2006.01)

(52) U.S. Cl.
CPC ........................................ *B60P 3/205* (2013.01)
USPC ........................................ 410/129; 296/24.41

(58) Field of Classification Search
USPC ......... 410/117, 118, 119, 129, 130, 140, 131, 410/135; 160/40; 52/404.4; 296/24.35, 296/24.41; 220/530, 533, 544, 552, 551; 62/263, 329, 447; 49/316, 317, 466, 49/477.1
See application file for complete search history.

(56) References Cited

U.S. PATENT DOCUMENTS

| | | |
|---|---|---|
| 5,265,993 A | 11/1993 | Wayne |
| 6,626,625 B2 | 9/2003 | Nelson et al. |
| 6,923,610 B2 | 8/2005 | Nelson et al. |
| 7,214,017 B2 | 5/2007 | Nelson et al. |
| 7,249,921 B2 | 7/2007 | McMahon et al. |
| 7,445,412 B2 | 11/2008 | Nelson et al. |
| 7,607,874 B2 | 10/2009 | Nelson et al. |
| 8,087,859 B2 | 1/2012 | Nelson |
| 8,186,917 B2 * | 5/2012 | Nelson et al. .................. 410/129 |

OTHER PUBLICATIONS

U.S. Appl. No. 13/248,396, filed Sep. 29, 2011, Nelson, et al.
U.S. Appl. No. 95/000,326, filed Dec. 4, 2007, Nelson, et al.
U.S. Appl. No. 13/341,491, filed Dec. 30, 2011, Nelson.
U.S. Appl. No. 13/453,378, filed Apr. 23, 2012, Nelson, et al.

* cited by examiner

*Primary Examiner* — Stephen Gordon
(74) *Attorney, Agent, or Firm* — Oblon, Spivak, McClelland, Maier & Neustadt, L.L.P.

(57) ABSTRACT

Some embodiments of a system for partitioning cargo spaces in a temperature-controlled cargo container can include one or more longitudinal panel assemblies with a user-selectable height feature. In such circumstances, a user can readily adjust the overall height of each longitudinal panel assembly while the longitudinal panel assembly is in the trailer so as to accommodate the interior height of the trailer (which might vary from trailer to trailer).

7 Claims, 9 Drawing Sheets

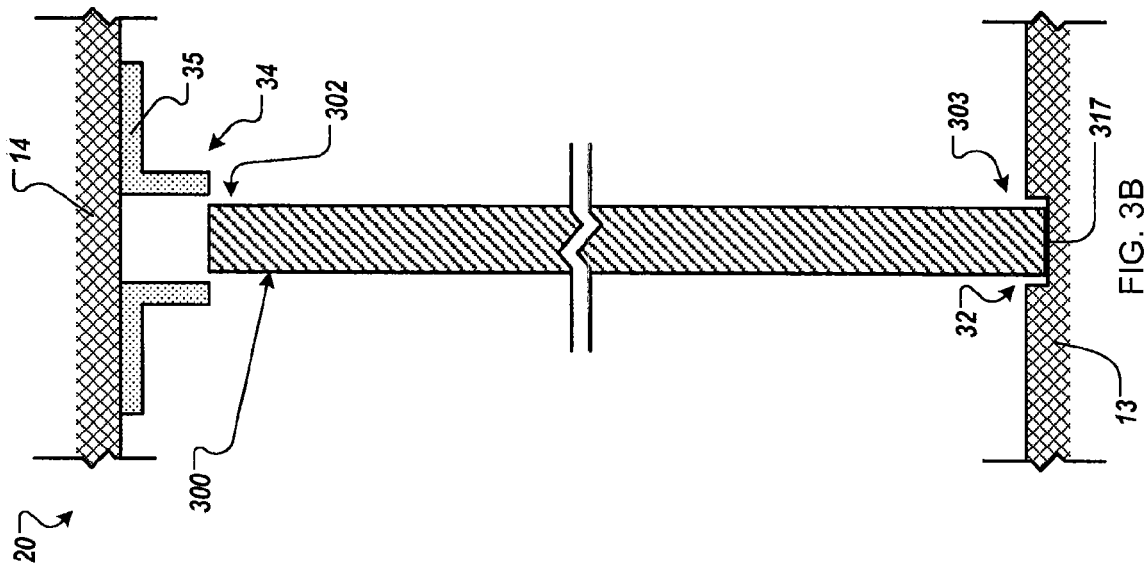
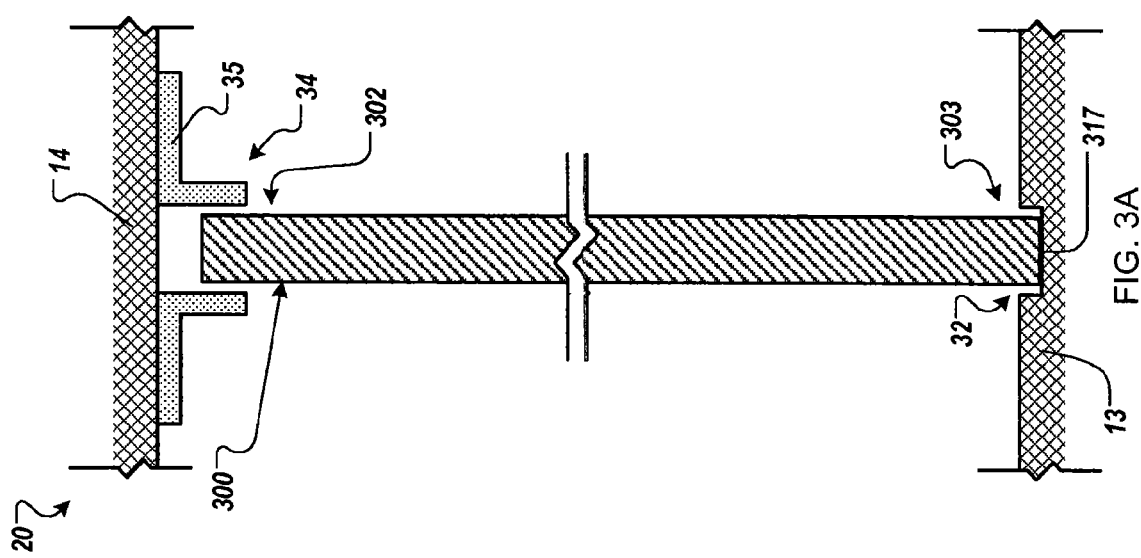

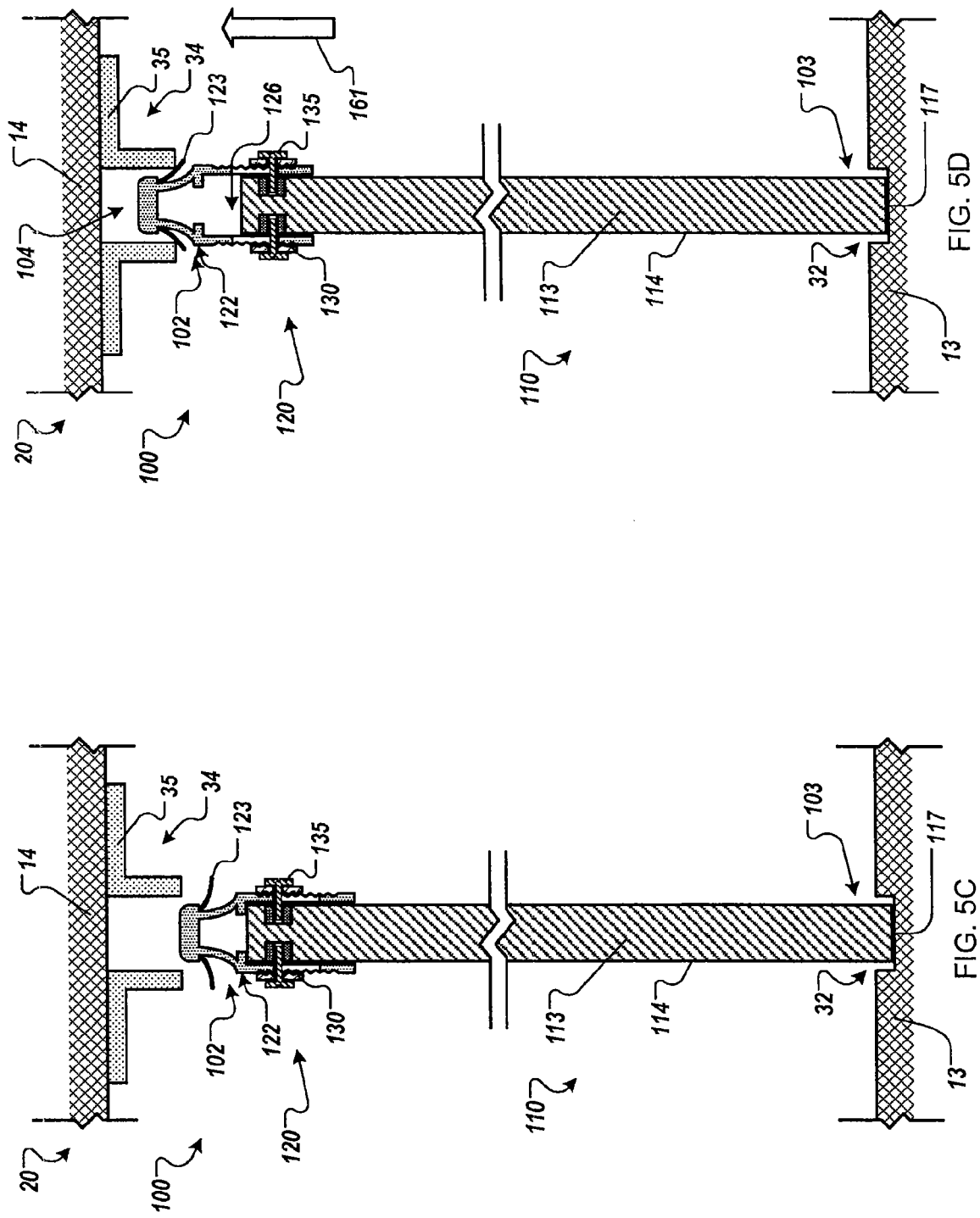

PARTITIONING CARGO SPACES

CROSS-REFERENCE TO RELATED APPLICATIONS

This application is a divisional of U.S. application Ser. No. 12/357,064, filed Jan. 21, 2009, and now issued as U.S. Pat. No. 8,186,917, the entire content of which is incorporated herein by reference.

TECHNICAL FIELD

This disclosure relates to partitioning cargo spaces, such as panels that can partition spaces in a temperature-controlled cargo container so as to provide different temperature zones during transport.

BACKGROUND OF THE INVENTION

Temperature-controlled cargo containers, such as refrigerated trailers, are commonly used to transport food products and other temperature-sensitive products. A refrigerated trailer generally includes a refrigeration unit mounted to the front wall of the trailer with inlet and outlet portions protruding into the interior of the trailer. The outlet of the refrigeration unit forces cooled air into the trailer near the ceiling of the trailer, thus causing the cooled air to cycle through the trailer. The inlet of the refrigeration unit is positioned to receive air that has cycled into the trailer. Refrigerated trailers are typically configured so as to define a single enclosed space. When the temperature-sensitive cargo does not fill the entire trailer space, cooling the entire space can be inefficient.

In some circumstances, longitudinal partition panels can be employed to divide the trailer space into longitudinal zones of selected sizes. For example, one longitudinal zone can be used to store frozen cargo while another longitudinal zone can be used to store fresh produce. The longitudinal partitions panels may be manufactured to a predetermined height so as to mate with a particular floor-to-ceiling height of a trailer. If, however, the trailer has a floor-to-ceiling height that is slightly different (e.g., due to manufacturing tolerances or other factors) the longitudinal partition panels may not fit properly within the trailer.

SUMMARY OF THE INVENTION

Some embodiments of a system for partitioning cargo spaces in a temperature-controlled cargo container (such as a refrigerated trailer) can include at least one longitudinal panel assembly with an adjustable-height seal so as to accommodate a floor-to-ceiling height inside the trailer. In particular embodiments, the longitudinal panel assembly may include an insulated panel and the adjustable-height seal mounted thereto. The insulated panel can be configured to mate with a longitudinal floor channel of the trailer while the adjustable-height seal can mate with a longitudinal ceiling channel of the trailer. If the floor-to-ceiling height of the trailer is too great or too small to properly engage the longitudinal panel assembly, a user can readily adjust the position of the adjustable-height seal while the longitudinal panel assembly is in the trailer so as to accommodate the interior height of the trailer (which can vary from trailer to trailer). Thus, the longitudinal panel assembly can be readily used in the trailer without the delays or inefficiencies raised when attempting to obtain a replacement panel having a different height.

In particular embodiments, a system for partitioning cargo spaces may include a refrigerated trailer having a longitudinal floor channel and a longitudinal ceiling channel to define a floor-to-ceiling height within an interior space of the trailer. The system may also include a plurality of longitudinal partition panel assemblies to releasably engage with the longitudinal floor channel and the longitudinal ceiling channel when the plurality of longitudinal partition panel assemblies are arranged in a side-by-side configuration to at least partially define longitudinal zones within the interior space of the trailer. Each longitudinal partition panel assembly may include an insulated panel and a seal assembly that is adjustably coupled along an upper peripheral edge of the insulated panel. The overall height of each longitudinal partition panel assembly may be user-selectable when the longitudinal panel assembly is in the trailer so as to accommodate the floor-to-ceiling height within the interior space of the trailer.

Some embodiments may include a system for partitioning cargo spaces in a cargo container (e.g., a refrigerated trailer or the like). The system may include a plurality of longitudinal partition panel assemblies to releasably engage with a longitudinal floor channel and a longitudinal ceiling channel of a cargo container when the plurality of longitudinal partition panel assemblies are installed in the trailer in a side-by-side configuration to at least partially define longitudinal zones within an interior space of the cargo container. Each of the longitudinal partition panel assemblies may include an insulated panel having a bottom edge to mate with the longitudinal floor channel when the longitudinal partition panel assembly is installed in the trailer and a top edge that extends short of the longitudinal ceiling channel when the longitudinal partition panel assembly is installed in the trailer. Also, each of the longitudinal partition panel assemblies may also include an adjustable height seal assembly releasably coupled along the top edge of the insulated panel. The adjustable height seal assembly may be adjustable relative to the insulated panel so as to mate with the longitudinal ceiling channel when the longitudinal partition panel assembly is installed in the trailer.

Other embodiments may include a method of partitioning cargo spaces in a refrigerated trailer. The method may include engaging a first longitudinal panel assembly within a longitudinal trailer floor channel and a longitudinal trailer ceiling channel within an interior space of the trailer. The method may also include adjusting a second longitudinal panel assembly from a first height to a second height according to an interior height of the trailer. The second longitudinal panel assembly may be adjusted to the second height by manually shifting the mounting position of an adjustable height seal assembly relative to an upper or lower peripheral edge of an insulated panel of the second longitudinal panel assembly. The method may further include engaging the second longitudinal panel assembly within the longitudinal trailer floor channel and the longitudinal trailer ceiling so that the first and second longitudinal panel assemblies are arranged in a side-by-side configuration to at least partially define longitudinal zones within the interior space of the trailer.

These and other embodiments described herein may provide one or more of the following benefits. First, some embodiments of a system partitioning cargo spaces in a trailer can be configured with one or more longitudinal panel assemblies suitable to at least partially define side-by-side zones within the trailer. As such, the trailer can provide a number of different climate-controlled zones, for example, during the transport of perishable items. Second, one or more longitudinal partition panels can be equipped with an adjustable height assembly so that the overall height of the longitudinal partition can be modified on site to accommodate the interior height of the trailer (which can vary from trailer to trailer).

Accordingly, a user can readily adjust the height of the longitudinal partition while inside the trailer to fit with the particular floor-to-ceiling height of that trailer, thereby alleviating the inefficiencies related to acquiring a new partition having a different height. Third, one or more longitudinal partition panels can be equipped with an adjustable height seal coupled proximate to a top edge of the partition panel so that the seal can engage a ceiling channel to restrict air flow between different cargo zones. Fourth, the longitudinal partition panels can be employed in combination with one or more lateral panels so as to define a number of temperature-controlled cargo zones. The position of the longitudinal partition panels or the lateral panels can be shifted by a user inside the trailer so that the cargo zones are customized for different cargo loads.

The details of one or more embodiments of the invention are set forth in the accompanying drawings and the description below. Other features, objects, and advantages of the invention will be apparent from the description and drawings, and from the claims.

DESCRIPTION OF THE DRAWINGS

FIGS. 3A-3B are cross-section views of a longitudinal partition panel in trailers of differing interior heights, in accordance with some embodiments.

FIGS. 5A-5D are cross-section views of an adjustable-height seal assembly being adjusted on a longitudinal partition panel to accommodate trailers of differing interior heights, in accordance with some embodiments.

Like reference symbols in the various drawings indicate like elements.

DETAILED DESCRIPTION OF ILLUSTRATIVE EMBODIMENTS

Figure 1:
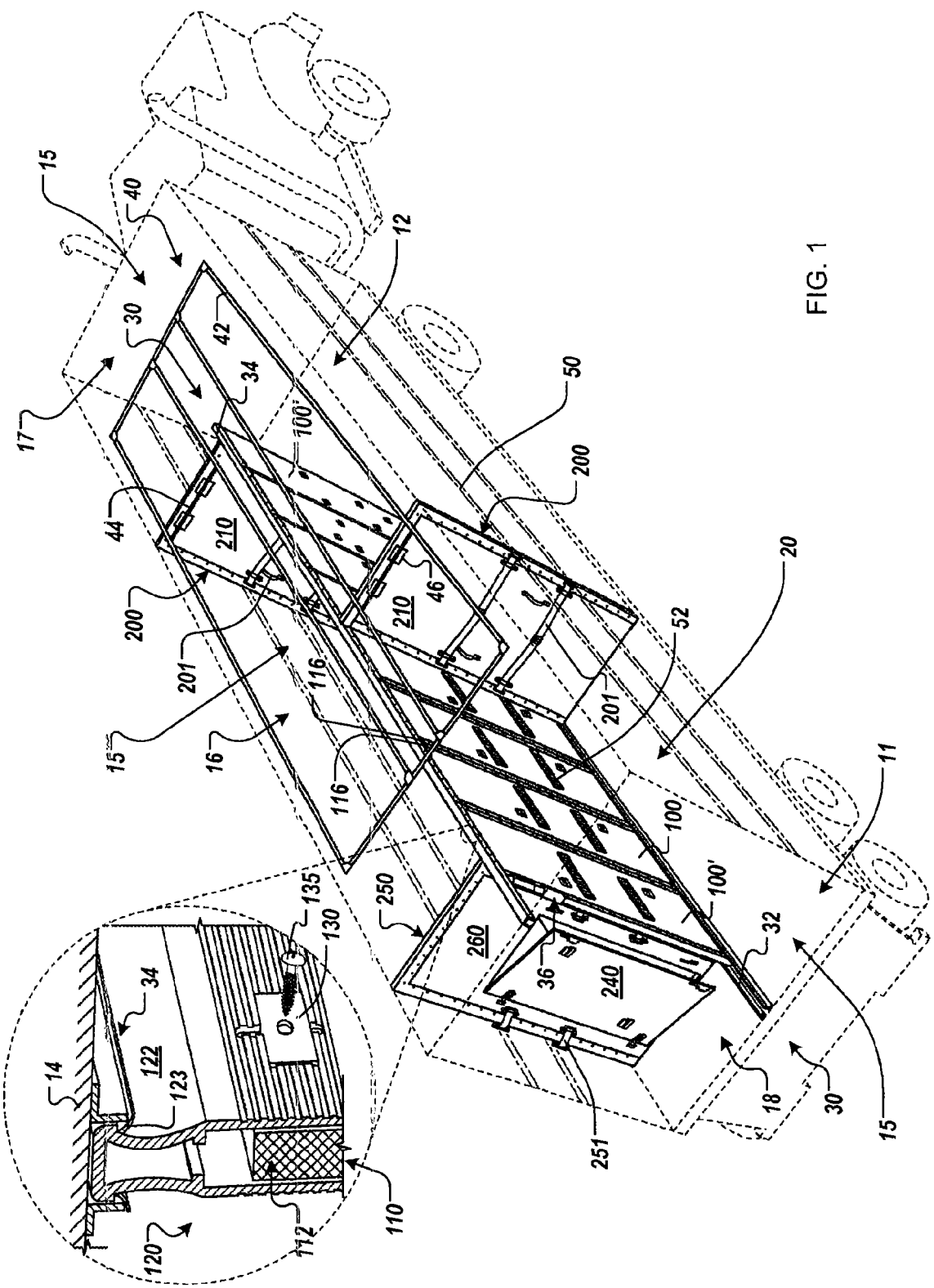
FIG. 1 is a perspective view of a system for separating cargo spaces in a trailer, in accordance with some embodiments.
Figure 2:
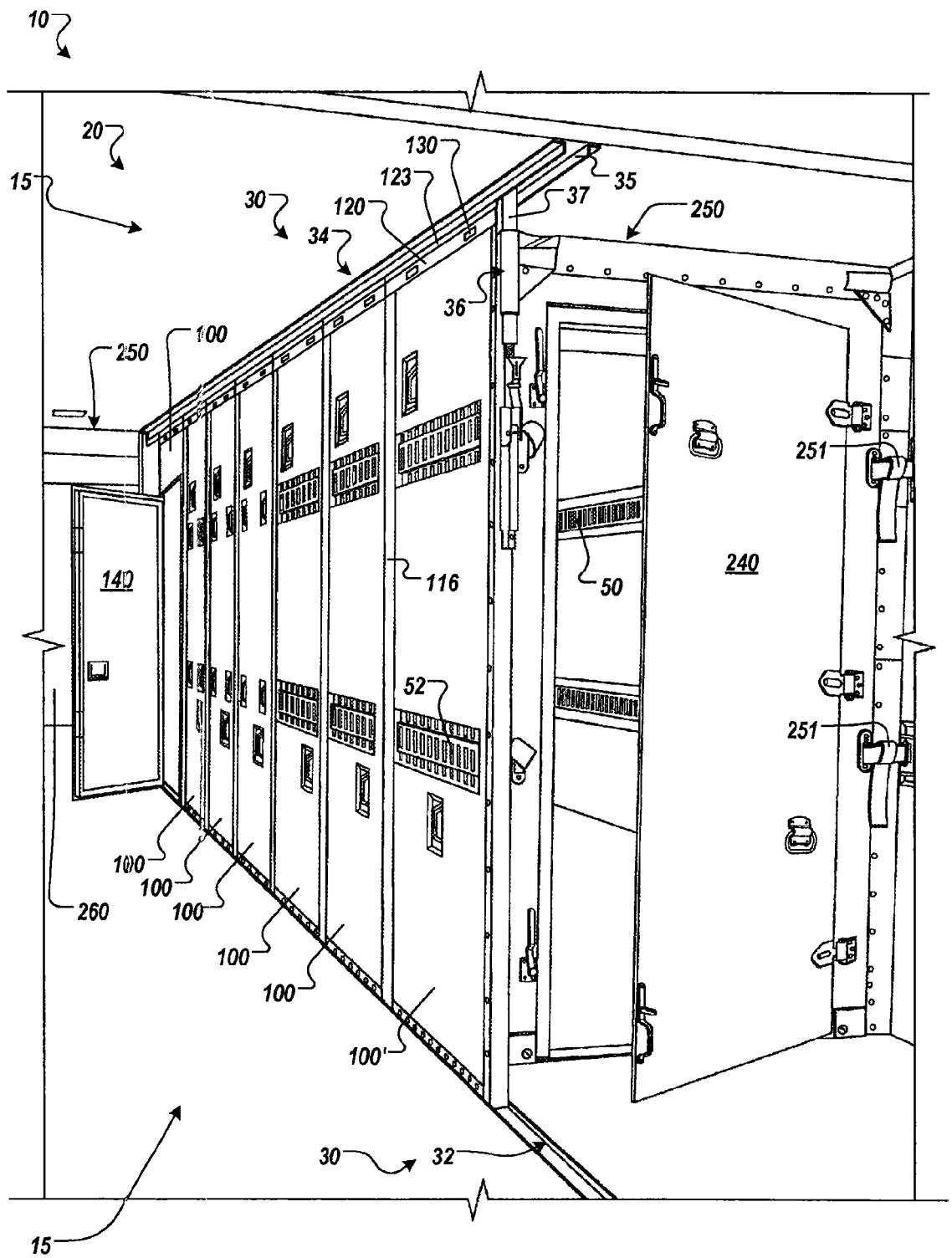
FIG. 2 is perspective view of portions of the system for separating cargo spaces of FIG. 1, with some panels arranged in a different configuration.

Referring to FIGS. 1-2, a trailer 10 can enclose a cargo space 15 used for the transport of perishable and/or non-perishable items. In some embodiments, one or more of the items transported within the cargo space 15 may be physically separated from other items within the cargo space 15 for storing in different zones within the trailer 10 (e.g., different temperature zones). For example, some items may be required to be stored at temperatures, all of which are at or below the freezing point of water (e.g., a "frozen" zone), while other items may be required to be stored at ambient temperatures (e.g., a non-climate controlled zone). Still other items may be required to be stored at temperatures that are above freezing, but are below ambient temperatures (e.g., a "refrigerated" zone). In other embodiments, separation into zones may not be done to provide for different temperature zones. For example, zones may be separated based on the delivery point of the items within each zone. In this example, items for a particular delivery stop can be organized into a single zone. When the trailer arrives at a delivery stop, the entire contents of one zone, corresponding to the delivery stop, can be offloaded to that stop. A refrigerated trailer can be a cargo trailer 10 that is equipped to provide at least a frozen or refrigerated zone. For example, the refrigerated trailer may be equipped with a refrigeration unit or another climate control unit.

In some embodiments, a system 20 for separating cargo spaces in the trailer 10 can include one or more longitudinal partition panel assemblies 100. The longitudinal partition panel assemblies 100 can extend longitudinally within the trailer 10 when the panel assemblies 100 are installed in a side-by-side configuration along at least a portion of the length of the trailer 10. In the depicted embodiment, the longitudinal partition panel assemblies 100 can be used divide the trailer into a left zone and a right zone. Each longitudinal partition panel assembly 100 may be releasably secured to one or more neighboring longitudinal partition panel assemblies 100 so as to form a partition wall. Also, each longitudinal partition panel assembly 100 may be releasably secured to the trailer 10, for example, by mating with a channel-mounting system 30. In some embodiments, the channel-mounting system 30 can include a longitudinal floor channel 32 included in the floor of the trailer 10 and a longitudinal ceiling channel 34 included in the ceiling of the trailer 10. The channel-mounting system 30 can secure the one or more panel assemblies 100 while allowing them to be moved along the length of the trailer 10 (e.g., in a longitudinal direction), thus adjusting the front-to-back position of the partition wall within the trailer 10. The number of panel assemblies 100 secured in the channel-mounting system 30 can be used to adjust the overall length size of the partition wall that separates the left zone and the right zone.

As described in more detail below, the longitudinal partition panel assemblies 100 can include features that allow the overall height of the panel assemblies 100 to be user-selectable. In particular, trailers 10 and other cargo containers can include cargo spaces 15 of different overall heights (e.g., due to manufacturing tolerances of the trailers, interior customizations of some containers, or other factors). If the trailer has a floor-to-ceiling height that is slightly different from a standard dimension, the longitudinal partition panel assemblies can be readily adjusted on site (e.g., inside or near the trailer 10 or the like) so as to fit properly within the trailer 10. For example, each panel assembly 100 can include an adjustable-height seal assembly 120 coupled along a top portion 112 of an insulated panel 110, which allows the overall height of the panel assembly 100 to be adjusted to accommodate the interior height of the cargo space 15.

In some embodiments, the trailer 10 and panel assemblies 100 can include features that can cooperate to maintain the panel assemblies 100 in substantially fixed positions relative to each other and to the ceiling and floor of the trailer 10. For example, the channel-mounting system 30 can include the floor channel 32, the ceiling channel 34, and one or more adjustable panel stops 36. When of the longitudinal partition panel assemblies 100 are coupled to the channels 32 and 34, the left-to-right movement (e.g., perpendicular to the longitudinal channels 32 and 34) of the longitudinal partition panel assemblies 100 is limited by the channels 32 and 34. The panel stops 36 can be installed to limit the movement of the panel assemblies 100 in the longitudinal direction. In some embodiments, the outermost panel assembly 100' can be held in place relative to the channels 32 and 34 by the adjustable panel stops 36. When coupled to an outermost panel assembly 100', the panel stops 36 can include stop bars 37 (FIG. 2) the extend into the longitudinal ceiling channel 34 and secure the longitudinal position of the stop 36 relative to the trailer 10. By applying a longitudinal force to the panel assembly 100' prior to actuating the stop 36, seals around the panel assemblies 100 can be compressed, thus forming a partition wall from the individual panel assemblies 100 and minimizing the flow of air between neighboring panel assemblies 100. In some embodiments, the panel assemblies 100 can be secured to neighboring panel assemblies 100 using fastening straps (not shown in FIGS. 1-2), thereby forming a continuous partition wall.

Still referring to FIGS. 1-2, the system 20 can also optionally include one or more lateral panels 200, 250 that can be used, in conjunction with the panel assemblies 100 to further define a cargo space 15. For example, as depicted in FIG. 1, two track-mounted lateral panels 200 and a removable lateral panel 250 (e.g., three total lateral panels) can be arranged in the trailer 10 in an orientation that is perpendicular to the longitudinal partition panel assemblies 100. The lateral panels 200 and 250 can be used in conjunction with the longitudinal partition panel assemblies 100 to separate the cargo space 15 into a plurality of zones 16, 17, and 18 that can optionally be maintained at different temperature ranges. (It should be understood from the description herein that the configuration of the lateral panels 200, 250 in FIG. 1 is different from the configuration in FIG. 2. For example, FIG. 1 shows a configuration that employs both types of lateral panels 200, 250, while only the removable lateral panels 250 are employed in the configuration show in FIG. 2. Such differences are illustrative of the variety of configurations that can be employed when the longitudinal partition panel assemblies 100 are installed in the trailer 10.)

The lateral panels 200, 250 and the longitudinal partition panel assemblies 100 can include various interfitting modular constructions that allow them to be moved within the trailer 10. For example, as previously described, the longitudinal partition panel assemblies 100 can be coupled to the floor channel 32 and the ceiling channel 34 such that the panel assemblies 100 can be moved longitudinally within the trailer 10 to alter the position of the longitudinal partition wall. The two track-mounted lateral panels 200 can be mounted to a track-mounting system 40, including tracks 42, trolleys (not shown), pivot bars 44, and mounting plates 46, such that they may pivot from a substantially vertical orientation (depicted in FIGS. 1-2) to a stowed position (e.g., in a generally horizontal position adjacent the ceiling). Furthermore, the track-mounting system 40 can permit the lateral panels 200 to be longitudinally moved in the rearward direction (e.g., toward the aft portion 11 of the trailer 10) and the forward direction (e.g., toward the fore portion 12 of the trailer 10) to adjust the size of the zones 16, 17, and 18. The track-mounted lateral panels 200 can abut opposing surfaces of a longitudinal partition panel assembly 100 or can abut one another along adjacent peripheral edges (if no partition panel is arranged therebetween). The removable lateral panel 250 can employ a friction fit system that allows it to be removably secured in different locations within the trailer 10 to adjust the size of the zones 16, 17, and 18. In some embodiments, the lateral panels 200, 250 can be releasably secured in an operative position using securing straps 201, 251 to secure the lateral panels 200, 250 to side mounting rails 50 in the sides of the trailer 10 and/or mounting rails 52 in the longitudinal partition panel assemblies 100.

Still referring to FIGS. 1-2, the longitudinal partition panel assemblies 100 can include insulated panels 110 that facilitate the maintenance of different temperature zones. The insulated panels 110 can be constructed of one or more lightweight materials with good thermal insulation properties, such as expanded polypropylene. In some embodiments, the insulated panels 110 can advantageously be constructed from rigid materials so as to collectively form a rigid partition wall separating the climate controlled zones. In embodiments where the panels 110 are constructed from rigid materials, the individual panels 110 can deflect impacts and resist flexing that could breach the seal between neighboring panels. In some embodiments, the panels 110 can be constructed of flexible materials (with an insulative foam core) that allow the panels 110 to provide a degree of flexibility (e.g., to absorb impacts, to permit seal compression when forced into the side-by-side configuration, or the like). In those embodiments in which the panels 110 are constructed from flexible materials, one or both of the panels 110 may be transiently deformed during an impact but may resiliently return to the original shape without permanent damage or deformation.

The lateral panels 200, 250 may also include an insulative construction to facilitate the maintenance of different temperature zones. For example, the track-mounted lateral panels 200 may include a panel body 210 constructed of flexible materials with an insulative foam core so that the panel body 210 can be transiently deformed during an impact but may resiliently return to the original shape without permanent damage or deformation. In another example, the removable lateral panel 250 may include a panel body 260 constructed from rigid materials (with an insulative foam core) so as to support a door member 240 formed therein. Both types of lateral panels 200 and 250 can be equipped with flexible seal members (e.g., nylon seals or the like) so as to compress against the trailer walls, floor, and ceiling when arranged in the operative positions.

As shown in FIG. 1, each longitudinal partition panel assembly 100 can include an adjustable-height seal assembly 120 coupled along a top portion 112 of an insulated panel 110. The adjustable-height seal assembly 120 allows the user to adjust the overall height of the panel assembly 100 when the panel assembly does not fit properly between the floor channel 32 and the ceiling channel 34. Accordingly, if the trailer 10 has a floor-to-ceiling height that is slightly different from the standard dimension, the longitudinal partition panel assemblies can be readily adjusted on site so as to fit properly within the trailer 10. Referring now to FIGS. 3A-3B, some longitudinal partitions 300 may not include an adjustable-height seal assembly 120. In such circumstances, the user may be unable to adjust the overall height of the partition panel 300 when the panel 300 does not fit properly between the floor channel 32 and the ceiling channel 34 (FIG. 3B). For example, as shown in FIG. 3A, longitudinal partition 300 can be coupled to the interior of the trailer 10 when a top portion 302 of the longitudinal partition 300 is inserted into the longitudinal ceiling channel 34 while the bottom edge 317 of the longitudinal partition 300 is slid into the longitudinal floor channel 32. To facilitate the installation of the longitudinal partition 300 into the floor and ceiling channels 32 and 34, the height of the longitudinal partition 300 can be shorter than the overall floor-to-ceiling height between the bottom of the floor channel 32 and the top of the ceiling channel 34.

In some circumstances, a trailer manufacturer can produce trailers to have a floor-to-ceiling height of 102-inches with a tolerance of almost .+-.½ inch. Thus, one trailer can have a floor-to-ceiling height that is almost 1-inch greater than a second trailer produced by the same manufacturer. Moreover, other trailers may be customized so that the floor-to-ceiling height varies even more so. As shown in FIG. 3B, this discrepancy between the floor-to-ceiling heights of various trailers 10 can result in a scenario in which the longitudinal partition 300 does not fit properly within the floor channel 32 and the ceiling channel 34. For example, the top portion 302 of the partition panel 300 may extend short of the ceiling channel 34 so as to increase the likelihood of the partition panel 300 at least partially disengaging from the ceiling. In accordance with some embodiments of the invention, each longitudinal partition panel assembly can be equipped with an adjustable-height seal assembly 120 so that the user can readily adjust the overall height of the panel assembly 100 on site, thereby resolving the scenario depicted in FIG. 3B.

Figure 4A:
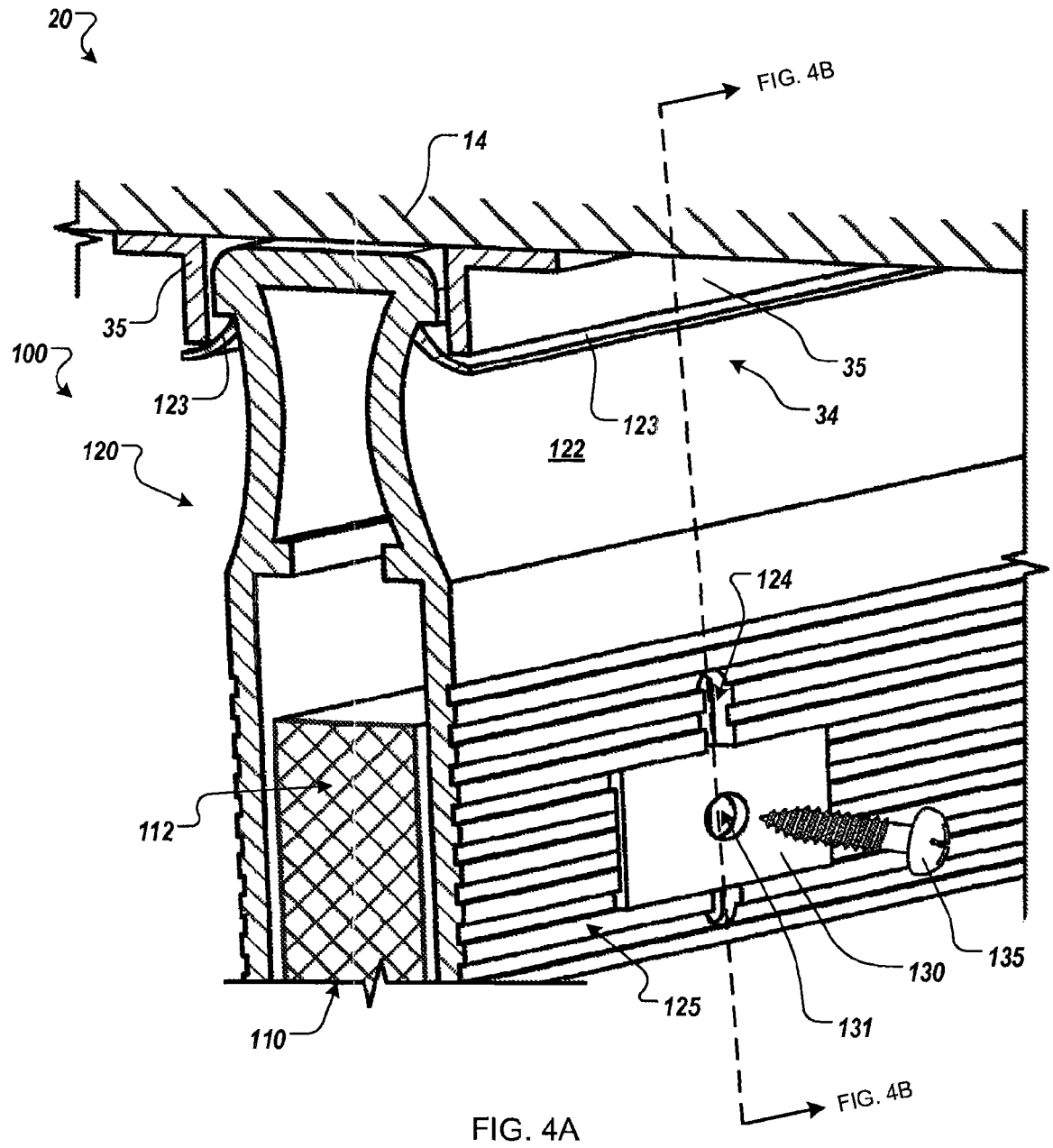
FIGS. 4A-4B are cross-section views of an adjustable-height seal assembly coupled to a longitudinal partition panel, in accordance with some embodiments.
Figure 4B:
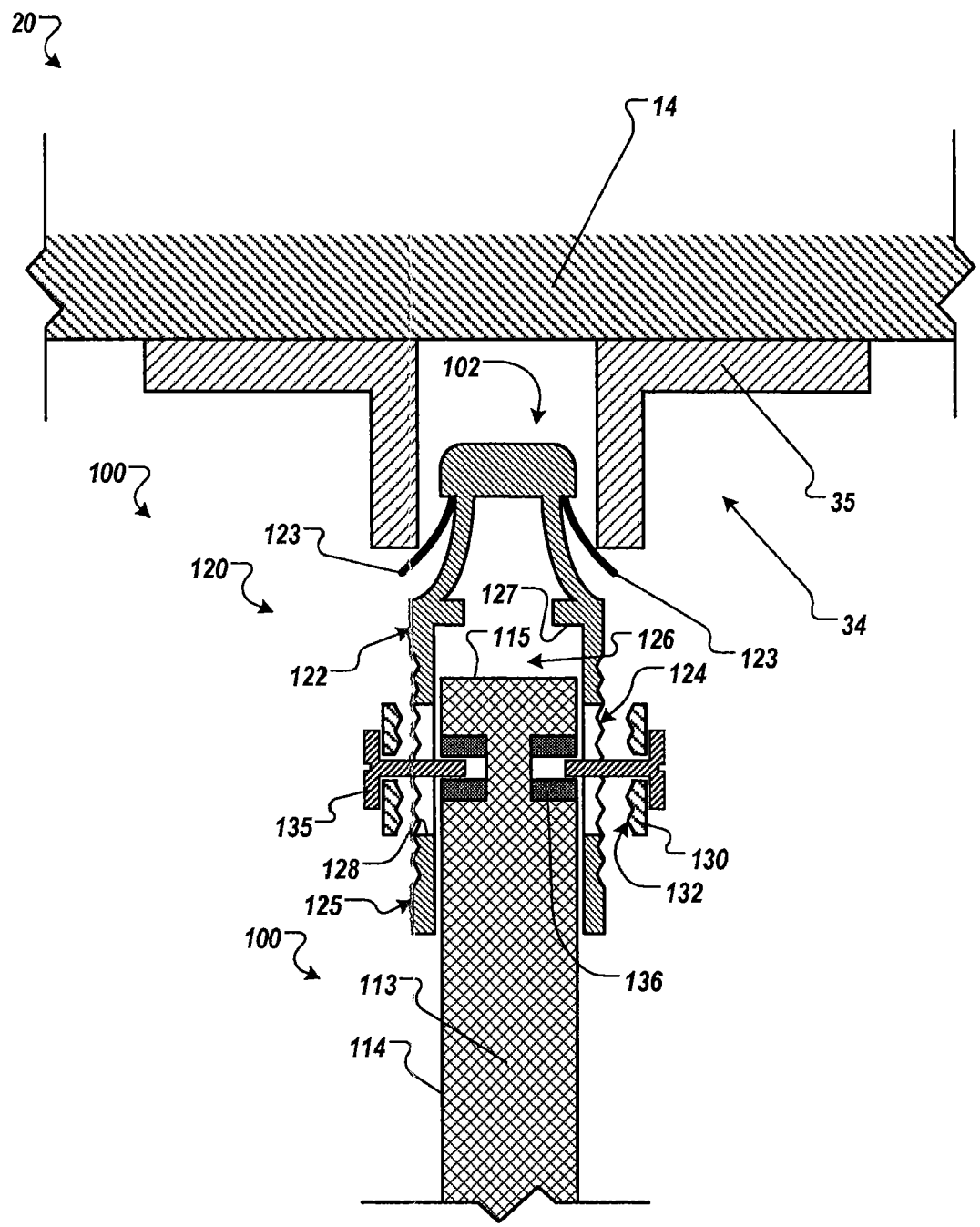

Referring now to FIGS. 4A-4B, the height adjustment assembly 120 of the longitudinal partition panel assembly 100 can include an adjustable-height seal 122 coupled to the top portion 112 of the panel 110. The seal 122 can be raised or lowered to adjust the overall height of the panel assembly 100 to accommodate different trailer heights. In some embodiments, the seal 122 can also include flexible sealing flaps 123 that can generally restrict the flow of air along the upper portion of the periphery of the panel assembly 100. For example, the sealing flaps 123 may inhibit air flow between the seal 122 and the ceiling channel 34.

In some embodiments, the adjustment assembly 120 can also include one or more fixation plates 130 and fasteners 135 (e.g., screws or the like) that can be used to releasably secure the seal 122 to the insulated panel body 110. Each of the fasteners 135 can cooperate with features in one of the corresponding fixation plate 130, seal 122, and the panel 110. For example, the threaded fastener 135 can be passed through a corresponding aperture 131 in one of the fixation plates 130, passed through a vertically extending slot 124 in the seal 122, and mated to a corresponding threaded retainer 136 (FIG. 4B) in the panel body 110. When the fasteners 135 are tightened, one or more horizontal ribs 132 can engage corresponding ribs 125 in the seal 122, thereby causing the position of the adjustable-height seal 122 to be fixed relative to the panel 110. These mating rib structures 125 and 132 can provide a plurality of user-selectable height increments for the adjustable height assembly 120. When the fasteners 135 are loosened, the ribs 132 in the fixation plate 130 can disengage from the corresponding ribs 125 in the seal 122. When disengaged, the seal 122 can be moved vertically (so that a different portion of the slot 124 aligns with the retainer 136) to adjust the overall height of the panel 110. A user can adjust the longitudinal partition panel assembly 100 to a selected height and then tighten the fasteners 135, thus fixing the position of the adjustable seal 122 relative to the panel 110 and maintaining the desired height of the panel 110. In such embodiments, the overall height of the longitudinal partition panel assembly 100 can be adjusted on site (e.g., in or near the trailer) rather than manufacturing the longitudinal partition panel assembly 100 with a fixed height. Thus, even if the floor-to-ceiling height varies from trailer to trailer, the overall height of the panel assembly 100 can be adjusted during installation into a particular trailer 10.

Referring now to FIGS. 5A-5D, as described previously, trailer manufactures can produce trailers with a nominal overall height and with a tolerance for error in this overall height. As previously described, some trailers are manufactured to have a floor-to-ceiling height of 102-inches with a tolerance of almost .+−.½ inch, and other trailers may be customized so that the floor-to-ceiling height varies even more so. As previously described, each longitudinal partition panel assembly 100 can be equipped with the adjustable-height seal assembly 120 so that the user can readily adjust the overall height of the panel assembly 100 on site, thereby accommodating the floor-to-ceiling height that varies from trailer to trailer.

Figure 5B:
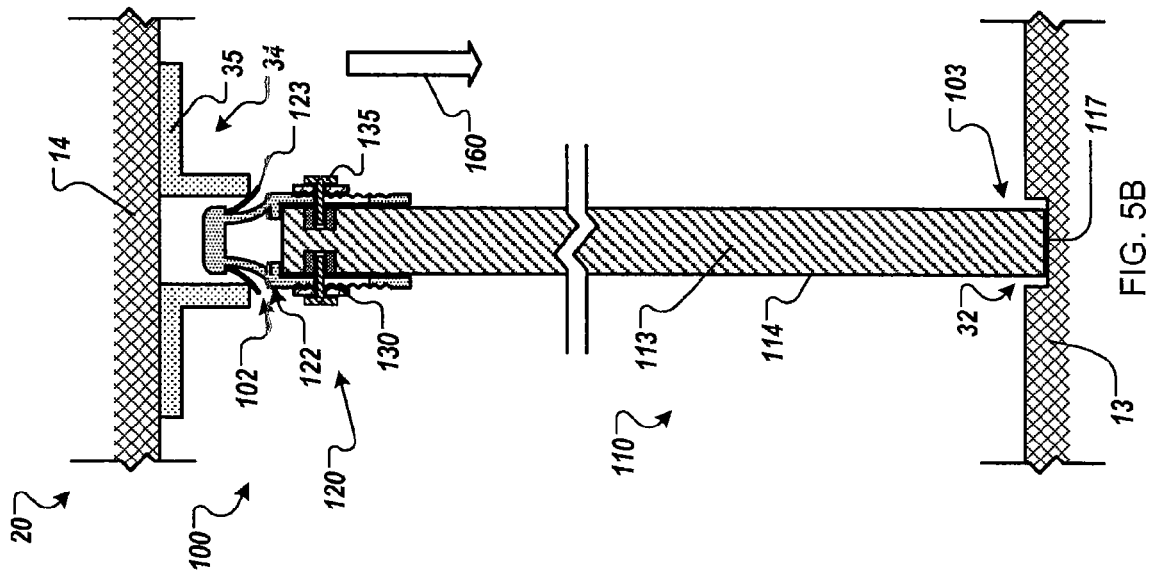
Figure 5A:
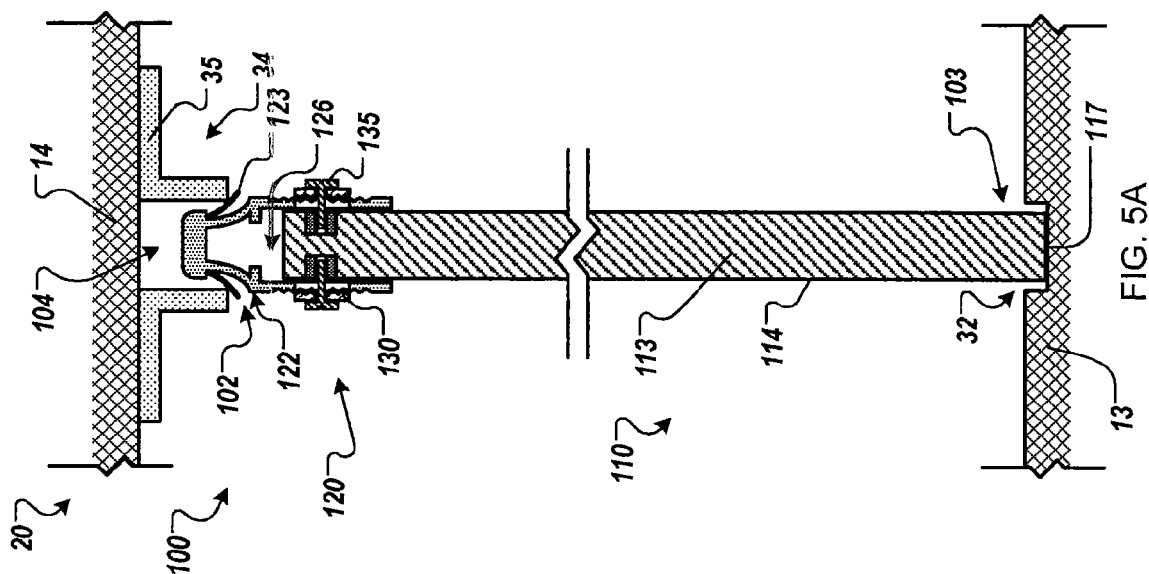

As shown in FIG. 5A, the longitudinal partition panel assembly 100 can serve as an insulative barrier and can include the panel body 110 and the adjustable height assembly 120. The panel body 110 may have multi-layer construction that includes an internal core 113 (e.g., that enhances the insulative effect of the panel assembly 100) and an external face 114. The internal core 113 of the panel 110 may comprise a rigid foam material (such as rigid polyurethane) that provides structural strength and suitable thermal insulation properties or a flexible foam material (such as an expanded polypropylene) that is bendably resilient and provides suitable thermal insulation properties. The external face 114 can include rigid materials (e.g., fiberglass, ABS, or the like) or flexible materials (e.g., vinyl, nylon reinforced PVC, or the like), bonded directly to the internal core 113. The external face 114 can be durable and resistant to tearing so as to protect the internal core 113 from damage. Also, the longitudinal partition panel assembly 100 can include a flexible seal 116 arranged along the side peripheries (see FIG. 1), such as a flexible PVC edge seal that can conform to surrounding objects (e.g., walls, ceiling, abutting panel edges, or the like). For example, the panel assembly 100 can include the flexible outer edge seal 116 that can abut neighboring panel assemblies (FIG. 1) or the front wall of the trailer 10, thereby restricting air flow around the periphery of the panel assembly 100. The longitudinal partition panel assembly 100 can include an optional floor seal (not shown) along a bottom edge 117.

In some embodiments, the longitudinal partition panel assembly 100 can be configured to be installed in a trailer 10 with a standard floor-to-ceiling height of 102 inches. In such circumstances, the overall height of a panel body 110 can be about 98¾ inches, which is less than the distance between the floor channel 32 and the lower edge of the ceiling brackets 35. As such, the adjustment assembly 120 can be secured to the panel body 110 so that the longitudinal partition panel assembly 100 securely engages with both the floor channel 32 and the ceiling channel 34. Accordingly, the adjustment assembly 120 facilitates engagement between the panel assembly 100 and the channels 32 and 34, provides restriction to the flow of air between the panel assembly 100 and the ceiling 14 of the trailer 10, and allows the height of the panel assembly 100 to be adjusted to accommodate trailers of differing heights.

In the example depicted FIG. 5A, the longitudinal partition panel assembly 100 can be coupled to the interior of the trailer 10 by inserting the top portion 102 of the panel assembly 100 into the longitudinal ceiling channel 34 while the bottom edge 117 of the panel assembly 100 is slid across the floor 13 of the trailer 10 until a bottom portion 103 of the panel assembly 100 drops into the longitudinal floor channel 32. The height of the panel assemblies 100 can be shorter than the overall floor-to-ceiling height of the interior of the trailer 10 to facilitate the installation of the panel assembly 100 in the manner described. In the example depicted in FIG. 5A, the overall height of the panel assembly 100 can be about 101.5-inches such that when the panel assembly 100 is positioned in the ceiling channel 34 and the floor channel 32, there can exist a ½-inch gap 104 between the top of the panel assembly 100 and the ceiling 14. When configured in this manner, there can also exist about a ½" gap 126 between an inside base 127 (see FIG. 4B) of the seal 122 and the top edge 115 (see FIG. 4B) of the panel 110. The purpose of the gap 126 is to allow the overall height of the panel assembly 100 to be made shorter to accommodate trailers that have a floor-to-ceiling height of less than 102".

Referring now to the example depicted in FIG. 5B, the panel assembly 100 can be adjusted by a user to accommodate the trailer 10 that has an overall height less than the predetermined 102-inch height described in FIG. 5A. As described previously, the fasteners 135 can be loosened, allowing the adjustable-height seal 122 to be moved down (e.g., the direction indicated by the arrow 160) until the overall height of the panel assembly 100 approximates the height desired by the user. For example, to install the panel assembly 100 in a trailer 10 that has an overall height of 101½ inches, the user may adjust the height of the panel assembly to about 101-inches. This can be achieved by loosening the fasteners 135 and moving the seal 122 downward until the inside base 127 (see FIG. 4B) of the seal 122 abuts the top edge 115 (see FIG. 4B) of the panel body 110. At this point, the fasteners 135 can be tightened, thus fixing the overall height of the panel 110. In this way, the panel assembly 100 is short enough that it can be installed in the longitudinal channels 32 and 34, as previously described, and tall enough that it can be retained within the channels 32 and 34 after being lowered into the floor channel 32.

Referring now to the scenario depicted in FIGS. 5C-5D, the panel assembly 200 can be adjusted by a user to accommodate individual trailers that that has an overall height greater than the predetermined 102-inch height described in FIG. 5A. As described previously, the fasteners 135 can be loosened, allowing the adjustable-height seal 122 to be moved up or down until the overall height of the panel assembly 100 matches the height desired by the user. For example, the panel assembly 100 can be adjusted to an overall height of 101" as described in connection with FIG. 5B (e.g., to be installed in a trailer 10 that has an overall height of 101½"). If this panel assembly 100 is transferred to a different trailer with an interior floor-to-ceiling height of 103-inches (as depicted in the example in FIG. 5C), the panel assembly 100 may be too short to couple to the both channels 32 and 34. Here, the user can employ the adjustable height assembly 120 to change the overall height of the panel assembly 100 to accommodate the greater interior height. As shown in FIG. 5D, the panel assembly 200 can be adjusted on site by the user to accommodate the trailer 10 that has an overall height that is 103-inches. As described previously, the fasteners 135 can be loosened, allowing the adjustable-height seal 122 to be moved up (e.g., the direction indicated by the arrow 161) until the overall height of the panel assembly 100 matches the height desired by the user. For example, to install the panel assembly 100 in a trailer 10 that has an overall height of 103 inches, the user may adjust the height of the panel assembly to 102½ inches. In some embodiments, this height adjustment can be achieved by loosening the fasteners 135 and moving the seal 122 upward until a bottom edge 128 (see FIG. 4B) of the vertical slot 124 abuts the fastener 135. In this position, the height of the gap 126 is about 1½ inches and the fasteners 135 can be tightened, thus fixing the overall height of the panel 110 at about 102½ inches. In this way, the panel assembly 100 is short enough that it can be installed in the longitudinal channels 32 and 34, as previously described, and tall enough that it can be retained within the channels 32 and 34 after being lowered into the floor channel 32.

Figure 6:
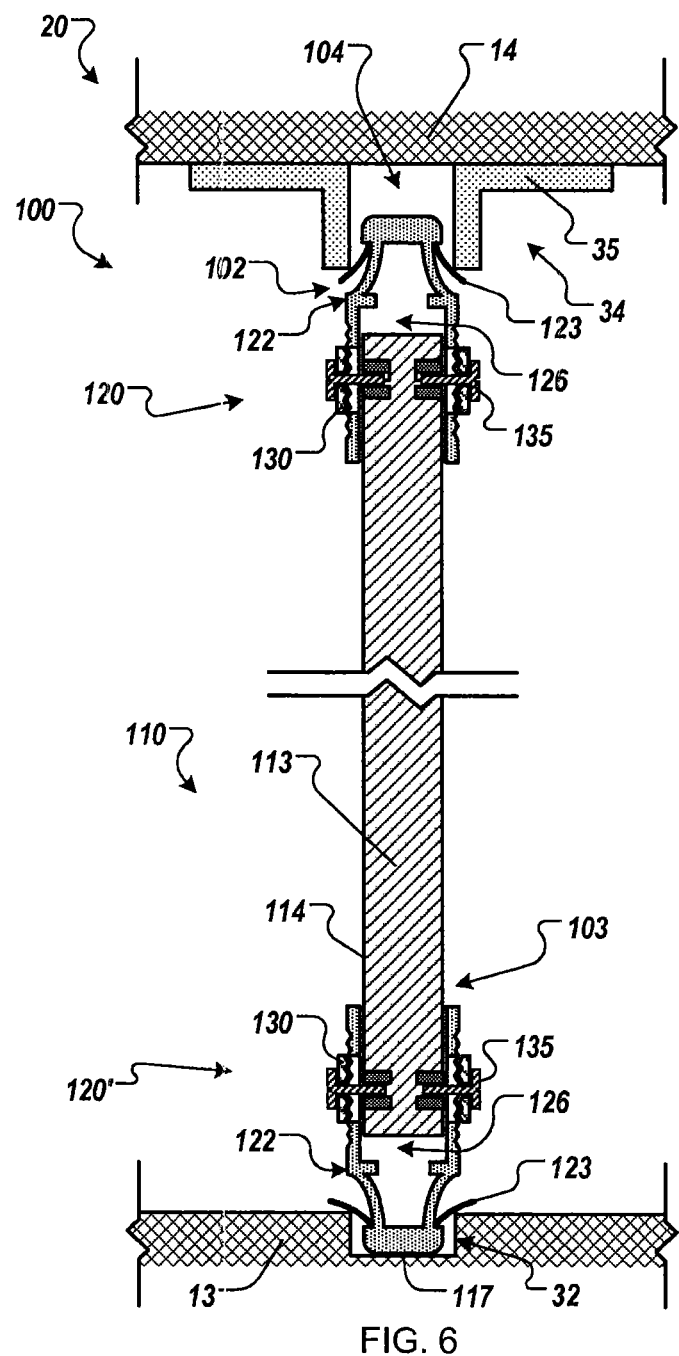
FIG. 6 is a cross-section view of two adjustable-height seal assemblies being adjusted on a partition panel to accommodate trailers of differing interior heights, in accordance with some alternate embodiments.

Referring now to FIG. 6, in some alternative embodiments, longitudinal partition panel assembly may have a different configuration than that depicted in FIGS. 5A-5D. For example, the longitudinal partition panel assembly 100 can include the adjustable-height seal assembly 120' implemented proximate the bottom edge 117 of the insulated panel 110. As shown in FIG. 6, adjustable-height seal assemblies (e.g., the assemblies 120 and 120') can be arranged at both the top and bottom of the panel 110, providing a user more options when installing the panel assembly 100. Alternatively, the seal assembly 120 can be implemented only proximate the bottom edge 117 of the panel 110.

In the embodiment depicted in FIG. 6, the longitudinal partition panel assembly 100 can serve as an insulative barrier and can include the panel body 110 and the upper and lower adjustable height assemblies 120, 120'. The panel body 110 may have multi-layer construction that includes an internal core 113 (e.g., that enhances the insulative effect of the panel assembly 100) and an external face 114. Also, the longitudinal partition panel assembly 100 can include a flexible seal 116 arranged along the side peripheries (see FIG. 1), such as a flexible PVC edge seal that can conform to surrounding objects (e.g., walls, ceiling, abutting panel edges, or the like).

In some embodiments, the height adjustment assemblies 120 and 120' of the longitudinal partition panel assembly 100 can include adjustable-height seals 122, which can be raised or lowered to adjust the overall height of the panel assembly 100 to accommodate different trailer heights. In some embodiments, the seals 122 can also include flexible sealing flaps 123 that can generally restrict the flow of air along the upper and lower portions of the periphery of the panel assembly 100. For example, the sealing flaps 123 may inhibit air flow between the seals 122 and portions of a trailer (e.g., the ceiling channel 34, the floor channel 32, and the like).

Still referring to FIG. 6, the upper and lower assemblies 120 and 120' can also include the fixation plates 130 and the fasteners 135 (e.g., screws or the like) that can be used to releasably secure the seals 122 to the insulated panel body 110. Each of the fasteners 135 can cooperate with features in one of the corresponding fixation plates 130 and seals 122, and the panel 110. When the fasteners 135 are tightened, the one or more horizontal ribs 132 can engage corresponding ribs 125 in the seal 122, thereby causing the position of the adjustable-height seal 122 to be fixed relative to the panel 110. When the fasteners 135 are loosened, disengaging the seal 122 from the panel 110, the seal 122 can be moved vertically (so that a different portion of the slot 124 aligns with the retainer 136) to adjust the overall height of the panel 110. In such embodiments, the overall height of the longitudinal partition panel assembly 100 can be adjusted on site (e.g., in or near the trailer) rather than manufacturing the longitudinal partition panel assembly 100 with a fixed height. Thus, even if the floor-to-ceiling height varies from trailer to trailer, the overall height of the panel assembly 100 can be adjusted during installation into a particular trailer 10.

Figure 7:
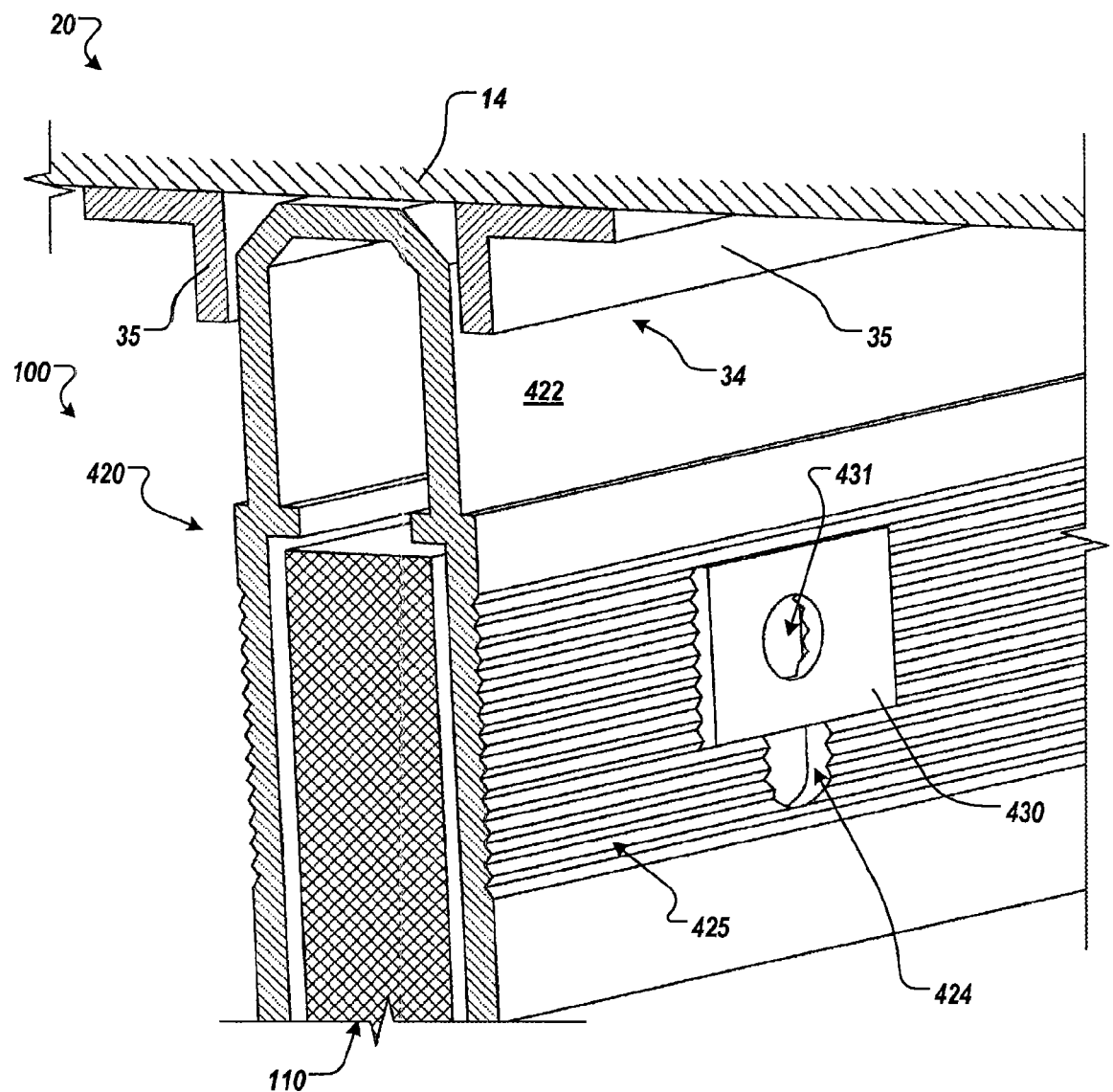
FIG. 7 is a cross-section view of an adjustable-height seal, in accordance with some alternate embodiments.

Referring now to FIG. 7, in some alternative embodiments, the adjustable height seal may have a different configuration than that depicted in FIG. 4A. For example, in this embodiment, the longitudinal partition panel assembly 100 can include the adjustable-height seal assembly 420 with a seal 422 having generally vertical sidewalls and a tapered top tip. In some circumstances, the cross-sectional shape of the adjustable height seal 422 can facilitate insertion into the ceiling channel 34. As previously described, the adjustable-height seal assembly 420 can advantageously allow the overall height of the panel assembly 400 to be adjusted by a user to accommodate trailers having different floor-to-ceiling heights. The adjustment assembly 420 can include one or more fixation plates 430 and threaded fasteners (not shown) that can be used to adjustably couple an adjustable seal 422 to a panel 410. Each of the fasteners can cooperate with corresponding features in one of the fixation plates 430, the adjustable-height seal 422, and the panel 410 to allow the seal 422 to be moved up or down, thus adjusting the overall height of the panel assembly 400. For example, one of the threaded fasteners can be passed through a circular opening 431 in one of the fixation plates 430, passed through a vertical slot 424 in the seal 422, and coupled to a corresponding threaded retainer (not shown) in the panel 410. As with previously described embodiments, the fixation plate 430 can be disengaged to vertically adjust the seal 422 and thus the overall height of the panel 110. A user can re-engage the fasteners to fix the position of the adjustable seal 122 relative to the panel 410 and thus maintaining the desired height of the panel 410.

A number of embodiments of the invention have been described. Nevertheless, it will be understood that various modifications may be made without departing from the spirit and scope of the invention. Accordingly, other embodiments are within the scope of the following claims.

The invention claimed is:

1. A method for partitioning a temperature controlled cargo space, the method comprising:
   providing a panel assembly including an insulated panel having a longitudinal upper edge and a first side vertical edge and a receiver member having a plurality of discrete vertical mounting positions spaced apart from one another proximate the upper edge, the receiver member further including a first interlocking engagement surface;
   providing an adjustable height seal assembly comprising an air seal portion configured to mate with a longitudinal ceiling channel and a height-adjustable mounting member having a second interlocking engagement surface, the height-adjustable mounting member configured to releaseably mount the adjustable height seal assembly to the panel assembly via an engagement between the first interlocking engagement surface and the second interlocking engagement surface;
   selecting a first position of the plurality of vertical mounting positions; and
   releaseably securing the height adjustable mounting member to the receiver member by placing the first interlocking engagement surface and the second interlocking engagement surface into an engaged condition.

2. The method of claim 1, further comprising:
   positioning the panel assembly in register with a longitudinal ceiling channel of a trailer;
   adjusting between the first position to a second position of the plurality of vertical mounting positions, wherein adjustment moves a distal edge of the air seal portion into sealed engagement with the ceiling channel of the trailer; and
   releasably securing the height adjustable mounting member to the receiver member by placing the first interlocking engagement surface and the second interlocking engagement surface into the engaged condition.

3. The method of claim 1, wherein the interlocking engagement surfaces comprise complementary sets of vertical ribbed structures.

4. The method of claim 1, wherein the step of releasably securing comprises coupling a fastener to the height-adjustable mounting member, the receiver member, and a retainer recess in the insulated panel.

5. The method of claim 4, wherein the step of releasably securing further comprises inserting the fastener through a first height adjustment aperture in the height-adjustable mounting member and a second height adjustment slot in the receiver member.

6. The method of claim 1, wherein the air seal portion comprises a flexible seal surface to engage the longitudinal ceiling channel when the panel assembly is installed in the cargo space.

7. The method of claim 1, wherein the insulated panel further comprises a flexible seal member fixedly coupled along the first side vertical edge and a second side vertical edge.

* * * * *